United States Patent [19]

Nather

[11] 4,029,401

[45] June 14, 1977

[54] AUTOMATIC QUENCH COMPENSATION FOR LIQUID SCINTILLATION COUNTING SYSTEM

[75] Inventor: Roy E. Nather, Solana Beach, Calif.

[73] Assignee: Beckman Instruments, Inc., Fullerton, Calif.

[22] Filed: May 3, 1972

[21] Appl. No.: 250,089

Related U.S. Application Data

[63] Continuation of Ser. No. 650,842, July 3, 1967, abandoned.

[52] U.S. Cl. .............................. 250/328; 250/369
[51] Int. Cl.² .......................................... G01T 1/20
[58] Field of Search ............... 250/71.5 R, 106 SC, 250/328, 369

[56] References Cited

UNITED STATES PATENTS 3,721,824  3/1973  Bristol ........................ 250/106 SC Primary Examiner—Archie R. Borchelt
Attorney, Agent, or Firm—R. J. Steinmeyer; R. R. Meads

[57] ABSTRACT

A method is provided for automatically compensating liquid scintillation systems for efficiently counting samples of varying quench by establishing the amount of change of a system parameter such as gain required to restore the sample spectrum to be counted in at least one counting window to the proper counting window discriminator levels as a non-linear function of the change in a measure of quench. The degree of quench may be measured on each of the samples prior to counting, for instance by the external-standard channels-ratio method, and the system parameter automatically adjusted to restore the spectrum to the proper window or windows. Implementing circuitry shown includes a digital-to-analog converter and non-linear network which can be calibrated by using the endpoint of a known least quenched sample to establish the base gain and a reference standard and using a known, highly quenched sample to establish another point on the gain vs. external-standard curve to establish the slope, so that when the external-standard ratio is set into it the amount of gain restoration required appears as an output.

8 Claims, 17 Drawing Figures

COMPARISON OF EFFICIENCY IN $H_3$ AND $C^{14}/H^3$ CHANNELS WITH AND WITHOUT AUTOMATIC QUENCH COMPENSATION.

SAMPLES: ARGON DEMONSTRATION STANDARD 0, 0.05, 0.1, 0.2, 0.3, 0.4, AND 0.5 ml $CHCl_3$ ADDED TO 10 ml TOLUENE AND 5g/l PPO.

- NO AUTOMATIC QUENCH COMPENSATION
× AUTOMATIC QUENCH COMPENSATION

ROY E. NATHER
INVENTOR.

BY TE Kristofferson

ATTORNEY

- NO AUTOMATIC QUENCH COMPENSATION
× AUTOMATIC QUENCH COMPENSATION
⊗ AUTOMATIC QUENCH COMPENSATION SET TO RESTORE $C^{14}$ END POINT.

ROY E. NATHER
INVENTOR.

BY T E Kristofferson

ATTORNEY

ROY E. NATHER
INVENTOR.

BY T E Kristoffersen
ATTORNEY

AUTOMATIC QUENCH COMPENSATION FOR LIQUID SCINTILLATION COUNTING SYSTEM

This is a continuation of application Ser. No. 650,842, filed July 3, 1967, now abandoned.

CROSS-REFERENCE TO RELATED PATENTS AND APPLICATIONS

The following United States patents related to prior art systems in which gain or another system parameter was modified to improve system stability: U.S. Pat. Nos. 2,379,996 — Silverman; 2,659,011 — Youmans et al.; and 2,778,947 — Scherbotskoy. In addition, Packard U.S. Pat. No. 3,188,468 discloses a prior art attempt to minimize the effects of variations in quench in a liquid scintillation system. Also, copending patent application Ser. No. 480,034 — R. E. Nather "Method and Apparatus for Counting Standardization in Scintillation Spectrometry" filed Aug. 16, 1965, U.S. Pat. No. 3,381,130, and assigned to the assignee of the present invention, relates to a method of external-standard channels-ratio quench calibration which can be employed in the specific embodiment described in the present invention.

BACKGROUND OF THE INVENTION

This invention relates to automatic quench compensation for liquid scintillation counting systems, and more particularly to a method of restoring at least one endpoint of a quenched sample spectrum of counts-per-minute versus energy-of-events substantially up to a previously established counting window discriminator level for an unquenched sample spectrum using a signal varying as a function of quench.

Prior art radiation accumulation instruments suffered from system instability due to variations in photomultiplier gain, amplifier gain, counting window or discriminator level stability and similar effects which were caused, for example, by variations in temperature, line voltage or other environmental or instrument related effects. One early application for such instrumentation, for instance, was in the well-logging area such as disclosed in Silverman, Youmans et al. and Scherbotskoy, cited above. When dropping a probe containing a photomultiplier tube down in a deep well, extreme changes in temperature were encountered, resulting in variations in photomultiplier gain and amplifier drift for example, among a number of other effects as mentioned in columns 1 and 2 of Youmans et al. The Silverman patent attacked this problem by correcting for these drifts by transmitting a set of calibrating signals from the same location in the well, proportional to a substantially constant quantity, and comparing the amplitude of these signals with the amplitude of the sample signals. Youmans et al. improved upon this approach by varying the operating characteristics of at least one element in the scintillation counter system such as by changing the gain of an amplifier or photomultiplier tube. Scherbotskoy transmits such as standard and uses it to adjust the counting channel discriminator windows to shift them with regard to the position of the spectrum.

As stated above, all these systems were concerned with stabilizing the behavior of the instrument itself. Due to improvements in instrument components, and since present day soft beta liquid scintillation counting systems are not normally operated under extremes of environmental conditions, this type of effect is not a significant factor in degrading the operation of such equipment. The equipment itself has more than adequate stability and reproducibility for the application. If the user would restrict himself to very small samples of a chemically innocuous nature, such as labeled toluene, then all the samples would have the same spectrum endpoints and the same counting efficiencies in the various discriminator ranges or counting windows used. However, users frequently desire to put samples in these equipments which are chemically active and which reduce the light output of the transducing liquid scintillation solution in which they are dissolved. This reduction in light output, due to the chemical interference of the sample, is called "quenching" — in this case, "chemical quenching." It is also possible, of course, to have color quenching where the optical characteristics of the solution containing the sample vary. Examples of sample materials which cause chemical quenching are fatty acids, phosphates and halogenated hydrocarbons. Sometimes samples are obtained dissolved in a quenching solvent, such as a liquid sample dissolved in chloroform. The chloroform containing the sample is then added to a liquid scintillation mixture. The chloroform will quench the light output of the liquid scintillator, shifting the spectrum endpoints to lower values. The result of the spectrum shift is that the spectrum endpoints are no longer aligned with the previously established counting window discriminator levels and counting efficiencies in the windows are changed as a result of the sample quenching.

As disclosed in the Packard patent cited above, the prior art practice for quench calibration involves the preparation of a set of calibration curves, determined in advance for each different sample volume that may be encountered. This is done by preparing a series of samples of known activity for each different isotope that may be of interest. A different amount of quench material is then added to each sample in each series. The differently quenched samples in each series are then counted in an environment free of any standard so as to determine counting efficiency for each varying degree of quench, and in an environment exposed to a standard, such as the external-standard in the Packard case, or by using the external-standard channels-ratio method as disclosed in Nather cited above, so as to determine the counting efficiency for the standard for each varying degree of quenching. Based upon these data, a set of calibration curves are prepared for each isotope of interest and for each sample volume. Thus, the two observed counts for each unknown test sample are compared to determine counting efficiency at true sample activity levels.

In order to maximize the use of this approach, Packard, reference above, discloses what is call "balance point operation" where the peak of the spectrum of counts-per-minute vs. pulse height or energy is centered in the discriminator windows so that small variations to the left or right of the peak result in relatively small changes in counting efficiency within a particular window. However, when increased quenching is encountered, this system, which only minimizes the error at best, falls down and the spill-over from one discriminator window to another so degrades the resulting data that they may become completely ineffective. A "worst" example is spill-over from one discriminator window into another when performing dual label sample counting.

Accordingly, the problem is to make measurements under conditions where the molecules of the sample are intimately mixed with the molecules of the transducer, as in liquid scintillation, and where there is reduction of light output from the transducing liquid scintillation solution due to chemical or color interference of the sample which is in intimate contact with the transducer.

In any liquid scintillation spectrometer, the basic principle of nuclear detection is the same. A radioactive isotope decays and emits a number of subatomic particles. The beta particle, which is of primary concern in many applications, travels only a short distance and is extremely difficult to detect as a first order effect. Accordingly, a transducer is employed whose chemical combinations result in molecules excited into the singlet state by the near passage or collision with the beta particle. When the molecules return to their ground state, photons of light are radiated in all directions, generated as a result of the beta particle and of a much lower wavelength. The light, accordingly, penetrates the body of the chemical solution in which the isotope is dissolved or suspended and passes out of the container.

Beta particles are emitted from a given nuclide with a distribution of energies. When they are detected via the liquid scintillation process, the energy is released from the vial as "light," which in turn is converted into an electronic pulse. A number of photons is produced, proportional to the energy of the initiating beta particle, and the size of the electronic pulse is proportional to the number of photons which produced it and the efficiency of energy transfer in the vial. When quenching occurs, the light of photon output is reduced.

Anything which impedes the passage of the photons out of the container is known as a quenching agent. There are two general classifications as mentioned above — color and chemical quenching. Color quenching decreases the number of the photons leaving the container by absorbtion. Chemical quenching destroys the chemical ability of the transducer to produce photons. Both types have the apparent effect of shifting the apparent beta energy spectrum, counts-per-minute vs. energy, toward zero. The effect of quenching has to be taken into consideration to prevent major errors in the resulting data, making it of little value.

This has been known for some time and, as recited above with regard to Packard, graphs have been prepared using samples with known amounts of radioactivity and quenching agents to provide a means by which accumulated data can be corrected within limits of statistical error. However, as the quenching increases, the error involved increases at an exponential rate until it reaches such a magnitude that the data accumulated again becomes meaningless. In the prior art, samples having a wide range of quenching are grouped and the instrument is recalibrated to function with the more highly quenched samples, for instance, after the less quenched samples have been processed.

SUMMARY OF THE INVENTION

Accordingly, it is the object of this invention to provide a method for automatic quench compensation for samples of varying quench in liquid scintillation systems to permit an instrument to automatically substantially reestablish the relative positions of the discriminator windows and the sample spectrum for samples of different quench.

This and other objects are achieved by providing a method of automatic quench compensation where a reference measure of quench is taken on a sample prior to taking a sample count. The measure of quench is then compared with a reference voltage source which has been established to vary in proportion to the variation of the measure of quench with the level of a system parameter required to restore at least one isotope spectral energy endpoint substantially to a selected counting window discriminator level in order to determine the amount of adjustment of the system parameter required to restore the endpoint. This is followed by the appropriate adjustment of the system parameter required to restore the relative position of the discriminator windows and the sample spectrum and is followed in turn by taking a sample count.

The novel features which are believed to be characteristic of the invention are set forth with particularity in the appended claims. The invention, and further objects and advantages thereof, can best be understood by reference to the following description and accompanying drawings.

DESCRIPTION AND EXPLANATION OF PREFERRED EMBODIMENTS

Figure 1:
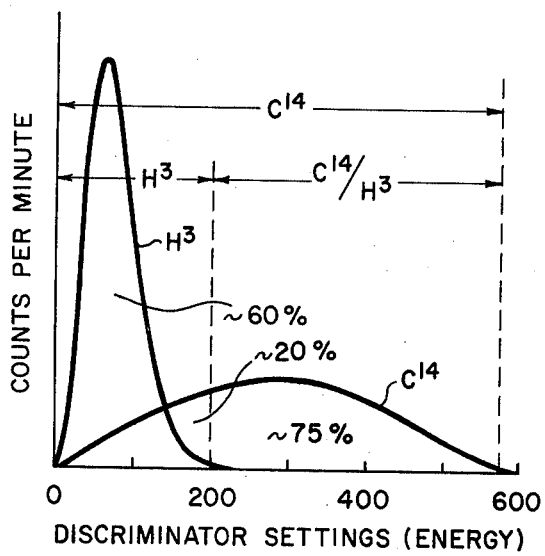
FIG. 1 is a graph of tritium and carbon 14 energy spectra in counts-per-minute vs. discriminator settings on a log energy scale, for an unquenched sample.

A brief consideration of what happens to the spectra will domonstrate how automatic quench compensation can restore the beta energy spectral endpoint and lost efficiency in the upper energy window and make it possible to count each sample in its optimum window. Considering the problem first in dual isotope counting, the spectra of tritium ($H^3$) and carbon 14 ($C^{14}$) are shown in FIG. 1. The spectra are illustrated in counts-per-minute along the ordinate versus counting window discriminator level divisions, or energy, on a log energy scale, where 1000 discriminator divisions is equal to approximately 3.7 MEV, along the abscissa. These coordinates are the same for all the subsequent spectral graphs. These spectra were taken on argon-flushed demonstration standards and represent least possible quench. The discriminator level window settings defining the counting channels, represented by the dashed lines, are chosen depending on counting objectives. Assume that the upper level of the $H^3$ channel is at the endpoint of the $H^3$ spectrum and that the full $C^{14}$ channel extends up to the $C^{14}$ spectrum endpoint. These may not always be the best windows but are useful for comparison. The approximate counting efficiencies in the various channels are indicated on FIG. 1.

Figure 2:
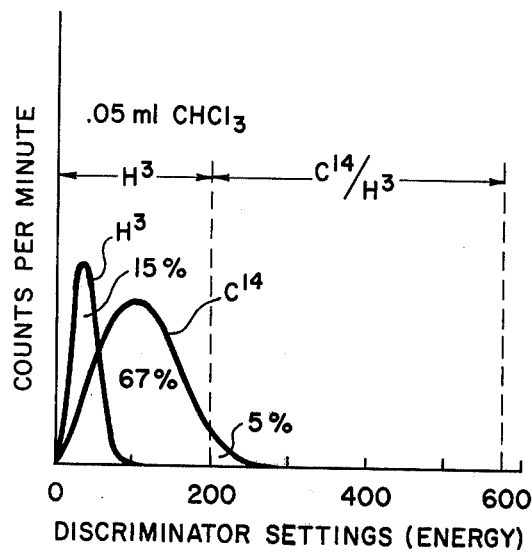
FIG. 2 is a graph illustrating the effect of quenching on the spectra of FIG. 1.

The effect of adding 0.5 milliliter of chloroform ($CHCl_3$) to each sample is shown by the spectra of FIG. 2. The $H^3$ efficiency has been reduced to 15%; however, more important, the $C^{14}$ content in the $H^3$ channel has risen to 67%. It would be virtually impossible to determine the $H^3$ activity in a mixed isotope sample under these conditions due to the extreme error in the calculation of the $C^{14}$ spill-over into the $H^3$ channel, and the extremely low efficiency for $C^{14}$ in the $C^{14}$ above $H^3$ ($C^{14}/H^3$) channel — here 5%.

Figure 3:
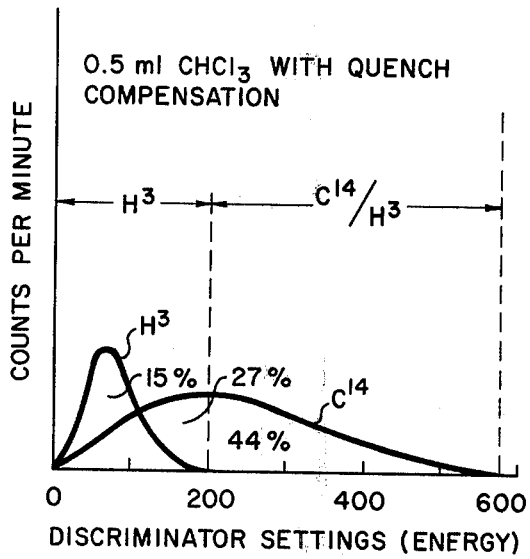
FIG. 3 is a graph illustrating the effect of quench compensation on the spectra of FIG. 2.

What has really happened is that the energy scale, on which the discriminators establishing the counting channels were set, is no longer valid. The $H^3$ endpoint of 18 KEV is no longer at 200 divisions of the abscissa. Instead, it has gone down to 100 divisions. Likewise, the $C^{14}$ endpoint has moved from approximately 570 to 250 divisions. The system can be compensated by resetting the energy scale so that 18 KEV is returned to 200 divisions. This may be done by manually raising the gain on a scintillation counter. The advantage of such compensation is shown in FIG. 3. Here, we still have 15% $H^3$ efficiency but the carbon spill-over has dropped to 27% in the $H^3$ channel and, even more striking, 44% $C^{14}$ efficiency now appears in the $C^{14}/H^3$ discriminator window. The automatic quench compensation of this invention can perform this operation automatically on every sample. This example has been made graphic by considering a "worst case" condition where the two examples represent extremes of quench encountered.

Figure 4:
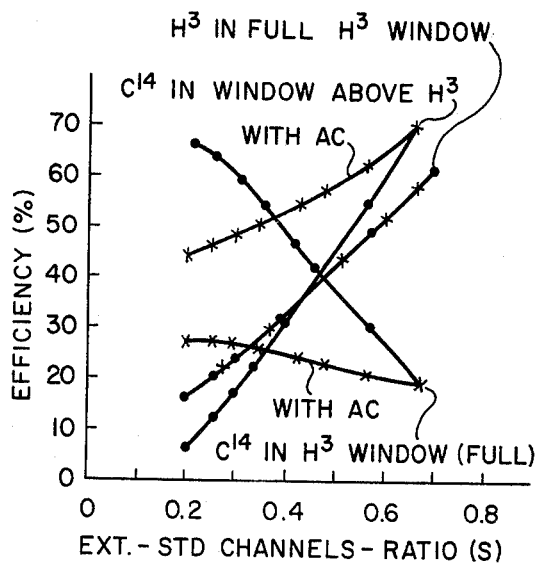
FIG. 4 is a graph of efficiency in percent vs. external standard channels-ratio, representative of varying degrees of quench, for $C^{14}$ in the window above $H^3$, $C^{14}$ in the $H^3$ window, and $H^3$ in the $H^3$ window, with and without quench compensation.

FIG. 4 represents performance with and without automatic quench compensation as a function of external-standard channels-ratio. Counting efficiency in percent is plotted on the ordinate against the external-standard channels-ratio on the abscissa. The curves plotted with X's show efficiencies with automatic quench compensation and the curves plotted with "dots" show performance without automatic quench compensation. The data were obtained on Beckman chloroform-toluene quench series. Making a vertical comparison at S or external-standard channels-ratio of 0.650, the $H^3$ efficiency in the full $H^3$ discriminator window is 57.5%. The $C^{14}$ in the $H^3$ channel is 19% and the $C^{14}$ in the $C^{14}/H^3$ window is 69.5%. At external-standard channels-ratio 0.300, the $H^3$ efficiency in the full $H^3$ window is 23.5%. With restoration, the $C^{14}$ efficiency in the $C^{14}/^3$ channel is 49% and the $C^{14}$ efficiency in the $H^3$ window is 26.5%. Without automatic quench compensation these values are 17.5% and 59.5% respectively. This demonstrates a significant benefit but can even be improved more by selecting more appropriate discriminator windows for dual label applications, which will be discussed hereinafter.

Figure 5:
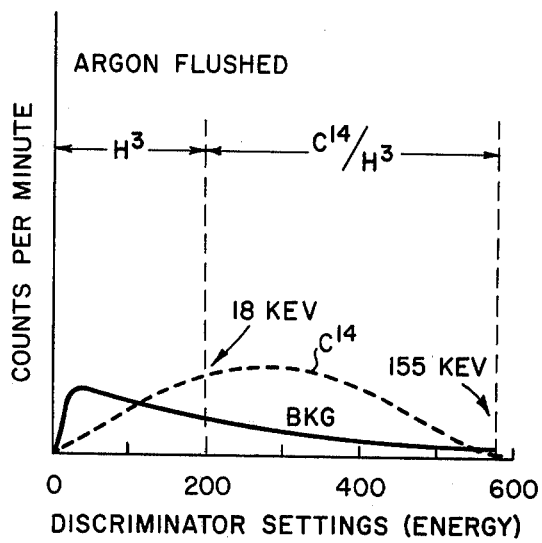
FIG. 5 is a graph in counts-per-minute vs. discriminator settings showing $C^{14}$ and background spectra on an unquenched sample.
Figure 6:
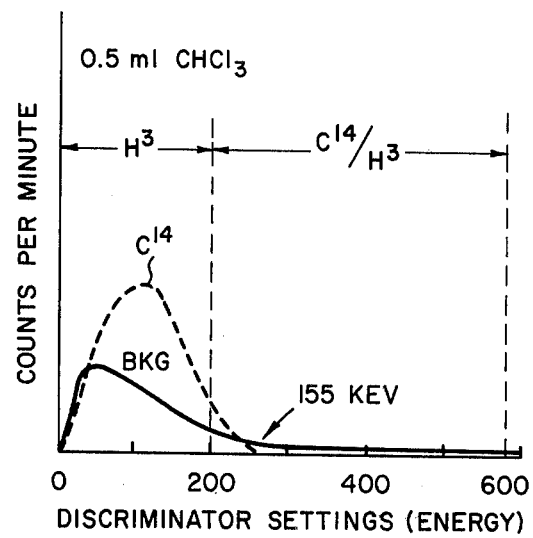
FIG. 6 is a graph illustrating the effect of quenching on the spectra illustrated in FIG. 5.
Figure 7:
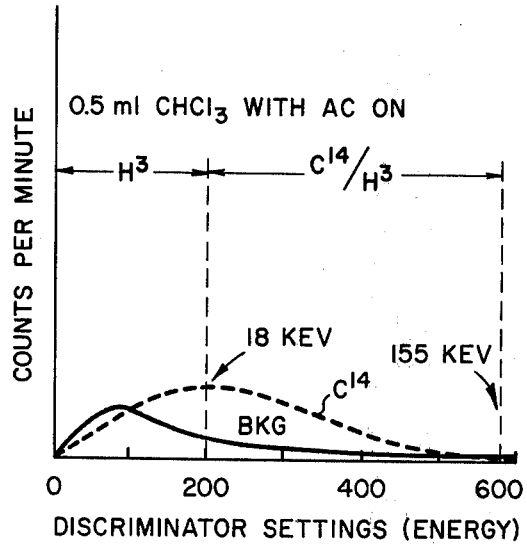
FIG. 7 is a graph illustrating the effect of compensation on the spectra of FIG. 6.

To demonstrate the effect of automatic quench compensation on background and efficiency, where high sensitivity is required, FIGS. 5, 6 and 7 illustrate the effect of quench on the spectra. FIG. 5 represents the curve of $C^{14}$ (the dotted line) vs. the background spectrum (the solid line). An argonflushed sample is involved. In FIG. 6, 0.5 milliliter of $CHCl_3$ is added, resulting in quenching of the $C^{14}$ curve. The shift of this curve with respect to the background demonstrates that relatively, in FIG. 6, the background is a larger percentage of the total count in the $C^{14}/H^3$ window than in FIG. 5. FIG. 7 demonstrates a system with the 0.5 milliliter of $CHCl_3$ with automatic quench compensation. Here the $C^{14}$ spectrum is restored to a larger percentage of the total count versus background in the $C^{14}/H^3$ window.

Figure 8:
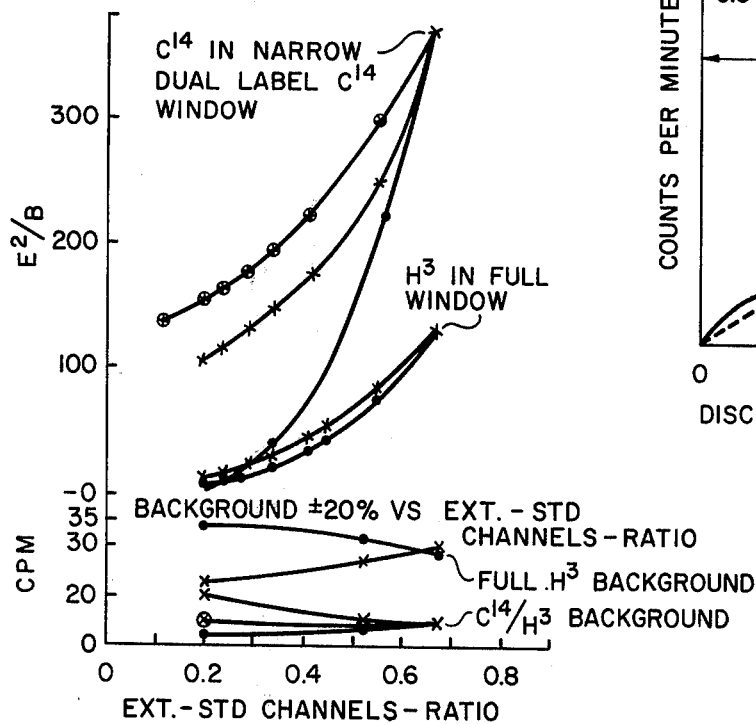
FIG. 8 illustrates two sets of curves. The lower set is a graph of counts-per-minute vs. external-standard channels-ratio illustrating the effect of quench on background with and without compensation. The upper set is a graph of $E^2/B$ vs. external-standard channels-ratio, a FIGURE of merit, illustrating the effects of quench on efficiency for tritium and $C^{14}$ with and without compensation.

FIG. 8 illustrates two sets of curves showing the effect of quench on background. The lower set plots the external-standard channels-ratio vs. background in counts-per-minute. The upper set of curves plots the external-standard channels-ratio vs. $E^2/B$, where $E^2/B$ is a FIGURE of merit calculated by squaring the counting efficiency in percent and dividing it by the background in counts-per-minute. The curves plotted with X's are with automatic quench compensation, and those plotted with dots are without automatic quench compensation. The curves plotted with Ⓧ's illustrate automatic quench compensation. when set to restore the $C^{14}$ endpoint rather than the $H^3$ endpoint.

As expected, the $H^3$ background increased with increasing quench without automatic quench compensation. Likewise, the $C^{14}/H^3$ (narrow $C^{14}$) background drops slightly. Since background is really a composite spectrum of environmental radiation, a shift toward the origin and extra counts in the $H^3$ channel are expected.

With automatic quench compensation, the background in the wide $H^3$ channel is reduced with increasing quench just as efficiency is reduced in the $H^3$ channel. What might not be expected is the slight increase in background with increasing quench in the $C^{14}/H^3$ channel with automatic quench compensation. This is due to the behavior of the $H^3$ spectrum. Above we have discussed endpoint restoration and reestablishment of the energy scale. When $H^3$ is quenched, the spectrum does not shift as rapidly as $C^{14}$, as can be seen from FIGS. 1 and 2. This is due to the predominance of 2–4 photon events in the $H^3$ spectrum. Once an event is quenched below 2 photons, it would never be counted in a coincidence system. As a result, as quenching agent is added to a $H^3$ sample, the spectrum first shrinks in energy but soon approaches the irreducible minimum size represented by two photoelectrons (one generated at the photocathode in each photomultiplier tube). Further addition of quenching agent reduces counting rate, but does not reduce the apparent $H^3$ energy. The $C^{14}$ spectrum would, however, continue to shrink under comparable conditions, since it is represented by about 10 photons for every $H^3$ generated photon. This non-linear effect must be taken into account in the design of a gain restoration system, so that the $H^3$ endpoint is not over-restored, as it would be in a linear restoration system.

When the $H^3$ endpoint is just restored, higher energy end-points (such as $C^{14}$) fall a little short of full restoration. This appears as a failure of the other spectra, including the background, to completely decompress and explains the increase in $C^{14}/H^3$ background.

When automatic quench compensation is used, the gain in efficiency for $C^{14}$ in the $C^{14}/H^3$ window more than offsets the slight increase in background, as borne out by the curves in FIG. 8. If the quench compensation is set to restore the $H^3$ endpoint as would normally be done, $E^2/B$ for $C^{14}$ will be increased above what would have been obtained without quench compensation. This may be seen by comparing the curves plotted with dots (no quench compensation) with the curves plotted with X's (quench compensation set to restore $H^3$ endpoint). If, however, the automatic quench is set to restore the $C^{14}$ endpoint (curves ⊗'s), the additional spectral decompression obtained increase $E^2/B$ still further.

The foregoing illustrates what happens to spectra when quenching occurs and demonstrates that quench compensation is desirable on each sample and that automatic quench compensation is feasible. When automatic quench compensation is used, better data are obtained for double label counting due to reduced crosstalk or spill-over from one channel into another and increased counting efficiency for the higher energy isotope. Also, better data are obtained for single label work where $E^2/B$ is important.

Turning now to how automatic quench compensation is accomplished, the object is to recalibrate the energy scale for each sample since variations in quench change the position of the spectra with respect to the discriminators. The external-standard channels-ratio gives a measure of the degree of quench in the system and the gain controls the energy scale. By establishing an electronic relationship between the external-standard channels-ratio and the gain required to restore a given energy point, it is possible to set the gain properly for each sample.

Figure 9:
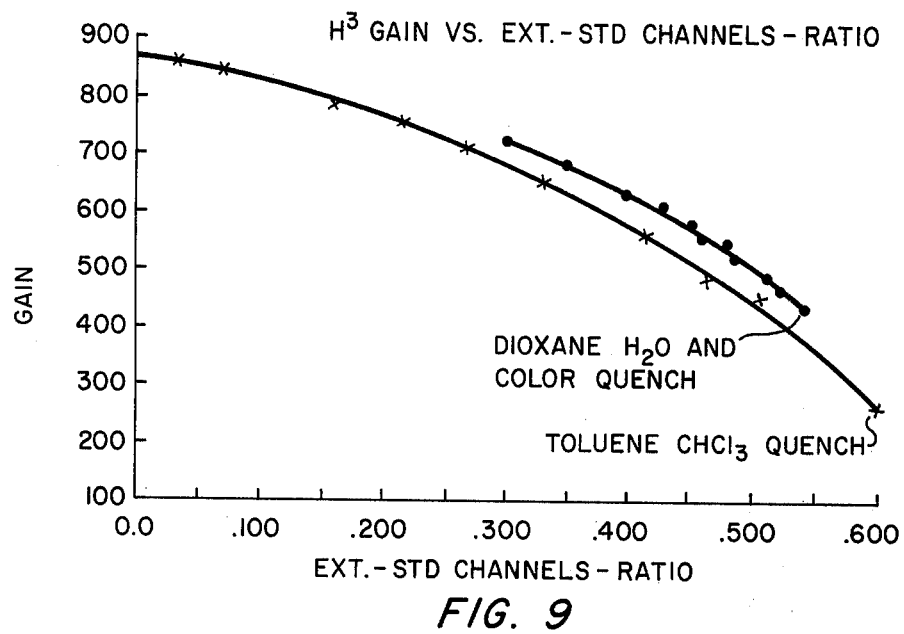
FIGS. 9 and 10 are graphs illustrating the variation of gain vs. external-standard channels-ratio taken on samples of known varying degrees of quench to illustrate the non-linearity gain of potentiometer changes required for quench compensation at various levels of quench.
Figure 10:
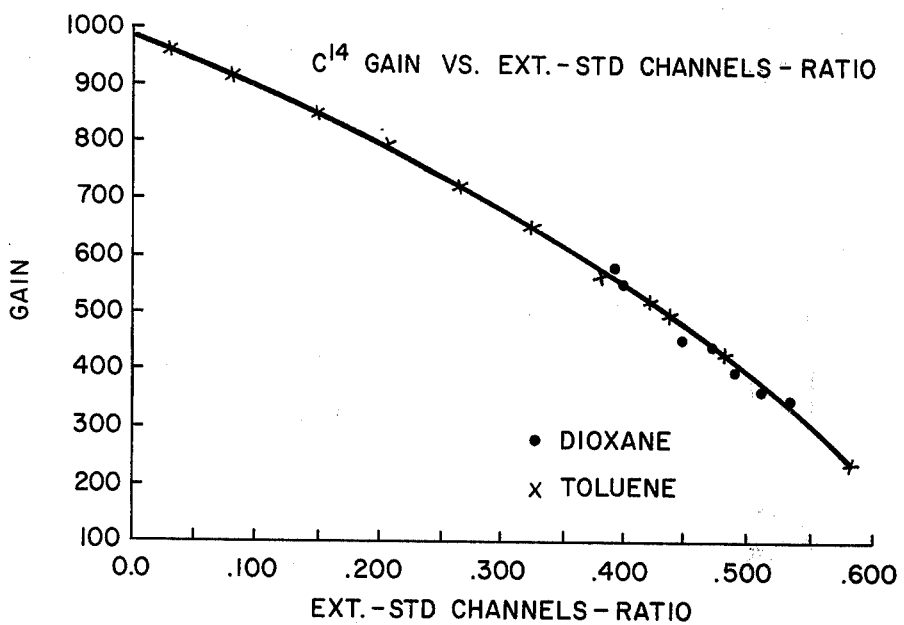

FIGS. 9 and 10 illustrate typical curves of gain requirements for recalibration vs. external-standard channels-ratio for $H^3$ and $C^{14}$ respectively. Gain is illustrated in dial divisions and is a non-linear function to compensate for the non-linear variations mentioned previously. These curves are shown as concave whereas curves showing a linear gain variation would be convex. These curves were obtained by calibrating the instrument by setting the endpoints of the least quenched sample. The gain required becomes the base gain. All standard ratios are taken at the base gain. For each successively more quenched sample, the standard ratio is taken. Then the gain required for compensation is determined. This may be done by adjusting for a small amount of spillover into the next highest energy window. For example, $H^3$ gain may be raised until ½ percent of the $H^3$ count rate is observed in the $C^{14}/H^3$ channel.

All curves such as shown in FIGS. 9 and 10, whether for $C^{14}$ or $H^3$ and regardless of the quench agent, have about the same shape. A curve of this shape may be built into an automatic quench compensation system. In practice, it is only necessary to determine base gain on the least quenched sample and the proper slope by getting a second point on an intermediate or preferably highly quenched sample. The ranges covered in FIGS. 9 and 10 are for argon-flushed samples to cocktails containing a milliliter of $CHCl_3$ per ten milliliters, which covers an efficiency range of 62% to 9.5%.

Once the instrument has been calibrated and set up for automatic quench compensation, it takes an external-standard on each sample at the base gain. The gain or other parameter may be automatically set to the proper level and counting proceeds at this level. When a new count is started on the same or a new sample, the process is repeated. For ordinary use, a careful initial calibration for $H^3$ will be adequate for all samples, only requiring periodic checks.

In solving problems posed by double label counting, it is necessary to look at performance under these actual conditions. It has been shown by P. D. Kline and W. J. Eisler, Jr. in an article entitled "An Improved Description of Separation and Performance Capabilities of Liquid Scintillation Counters Used In Dual Isotope Studies", Analytical Chemistry, Volume 38, No. 11, Pages 1453–1457 (October, 1966) and others, that the proper instrument discriminator settings for optimum dual label counting are not necessarily full windows. Complex mathematics are involved in determining optimum discriminator settings for a dual label experiment. Experimental factors are the ratio of activity of the two isotopes' counting efficiencies in the possible counting channels, and the statistics required in the final results.

Figure 11:
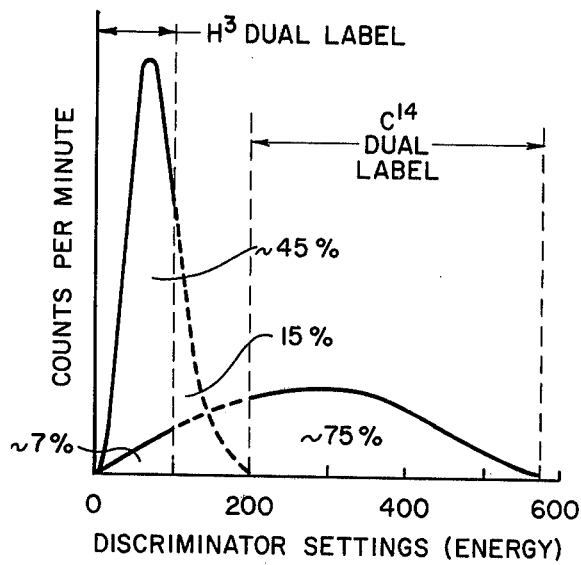
FIG. 11 illustrates spectra for $C^{14}$ and tritium in optimized dual label windows, where the upper $H^3$ discriminator window level is below the lower $C^{14}$ discriminator window level, without quench.

Experiments have shown that a good compromise to the $C^{14}$—$H^3$ problem is a window that includes the lower 75% of the $H^3$ spectrum (narrow $H^3$ window) and a window which includes the $C^{14}$ spectrum above the $H^3$ endpoint. FIG. 11 shows the relationship of the $C^{14}$ and $H^3$ spectra with respect to these windows for an unquenched sample. The percents illustrated are approximate counting efficiencies. Note that about 1/10th of the total $C^{14}$ being counted falls in the $H^3$ channel which ¾ of the $H^3$ spectrum falls into, yielding a $H^3$ efficiency of 45% and $C^{14}$ efficiency of 7%.

Figure 12:
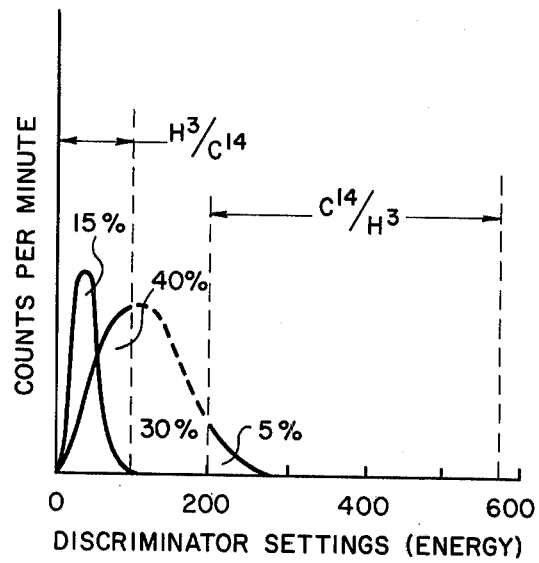
FIG. 12 illustrates the effects on the spectra of FIG. 11, and the changes in efficiency, with quench.

FIG. 12 illustrates what happens when the same sample is heavily quenched. Note that all of the $H^3$ spectrum and almost half of the $C^{14}$ spectrum are in the narrow $H^3$ channel. Further, only 5% counting efficiency is reserved for $C^{14}$ in its channel. It is practically impossible, regardless of counting time, to get any reliable numbers for $H^3$ activity under these conditions. The errors in calibration compounded with errors in counting, and finally calculations based on the differences of two large numbers make for poor quality results.

Figure 13:
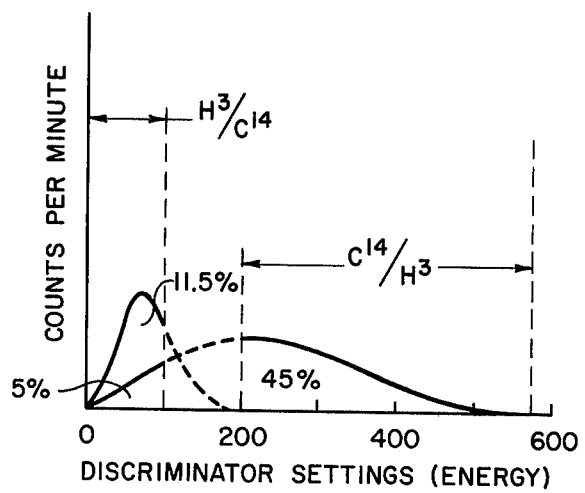
FIG. 13 is a graph illustrating the effect of quench compensation of the spectra of FIG. 12.

FIG. 13 illustrates the effects of quench compensation on this example. The balance has been restored by sacrificing 3.5% $H^3$ efficiency, which has dropped from 15 to 11.5%. The $C^{14}$ in the $H^3$ channel has been reduced 5-fold, from 40 to 8%, to its original level and, more important, the $C^{14}$ efficiency in the $C^{14}/H^3$ window has risen 9-fold, from 5 to 45%. It is now possible to accurately determine the $C^{14}$ in the $H^3$ channel. Actual numbers involved depend greatly on the isotope ratio. Aside from the error problem, the pure gain in $C^{14}$ efficiency in the $C^{14}/H^3$ channel provides a 9-fold saving in counting time. Automatic quench compensation compensates for each sample without operation tending.

From the foregoing, it can be seen that the optimum separation of $C^{14}$ and $H^3$, as an example of dual label counting, is only achieved at the initial calibration point. Increasing quench causes the separation and counting efficiency to deteriorate at an exponential rate until the quality of the data taken is unacceptable. Utilizing automatic quench compensation optimizes the spectrum-window relationship such that the separation and counting efficiency are always optimized.

Figure 14:
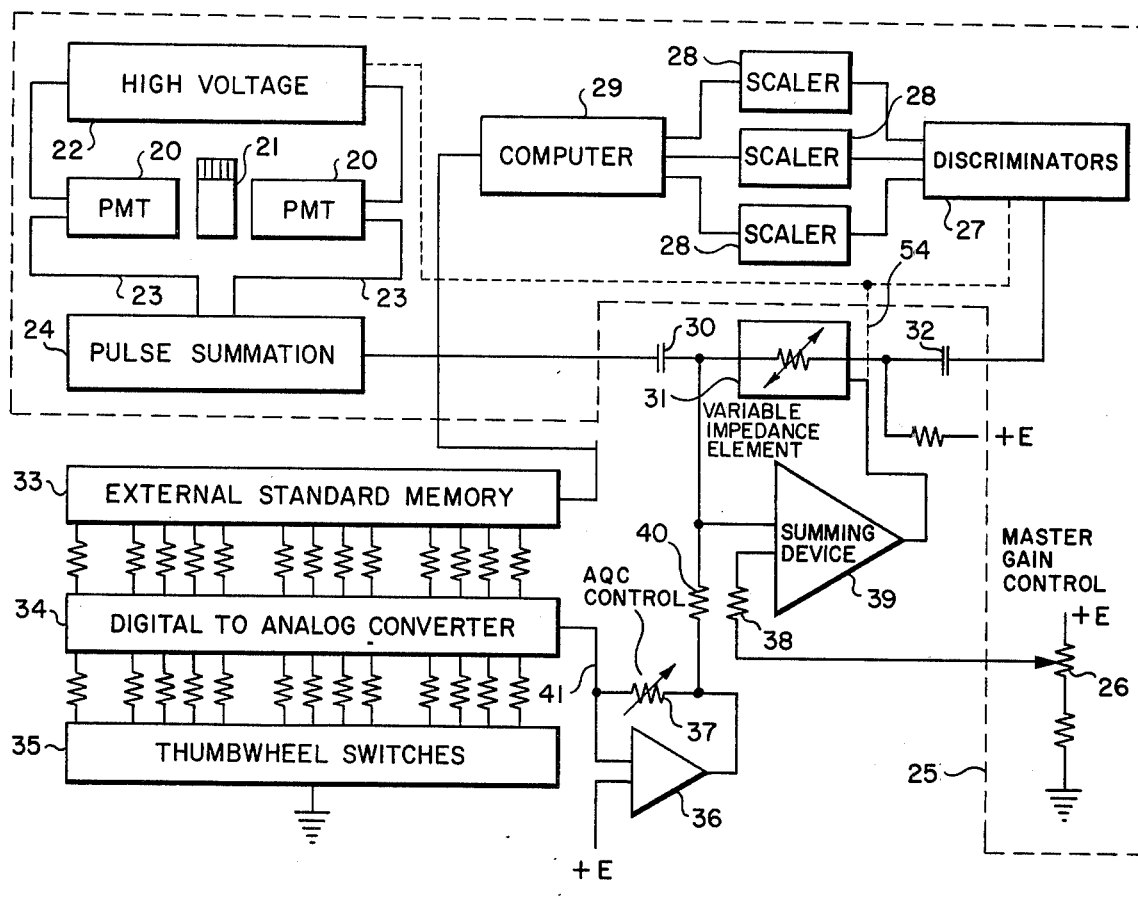
FIG. 14 is a block diagram of a system for carrying out the method of quench compensation disclosed herein.

Turning now to FIG. 14, there is shown in block diagram form a system for implementing the method of automatic quench compensation outlined heretofore. Two photomultiplier tubes 20 monitor a sample contained in liquid scintillation vial 21 and have a high voltage source 22 connected to them to provide the required voltage. The outputs of photomultiplier tubes 20 are connected over leads 23 to a pulse summation network 24. This network will detect coincidence in the outputs of the photomultiplier tubes 20 and only pass those pulses observed by both of the photomultiplier tubes.

The dashed line 25 contains that portion of the system which may be similar to the LS-200 provided by Beckman Instruments, Inc., which operates in a manner well understood by those skilled in the art. Only those portions of the LS-200 necessary to the explanation of the present invention have been specifically illustrated. The tubes 20 provide logarithmic response so that logarithmic application is not required in the subsequent circuitry to adjust to practical discriminator levels. Other components contained in this portion of the system are the master gain control potentiometer 26 and the discriminator network 27 which serves to define the counting channels, dividing the pulses up in accordance with their energy and passing them on in turn to the scalers 28 for accumulating the counts in each of the channels. Also, the outputs of the scalers 28 are connected, in turn, to the computer 29 which is programmed to calculate the various outputs required of the system, such as counts-per-minute in each of the channels and the external-standard channels-ratio, among others.

The output of the pulse summation network 24 is shown connected to the input of the discriminator network 27 through a series circuit including a decoupling capacitor 30, a variable impedance element 31 and a second decoupling capacitor 32. The output of the computer 29 is shown connected to the input of an external-standard memory 33, which is provided as one of the two inputs to a digital-to-analog converter 34 having as its other input a number of thumbwheel switches 35, the other sides of which are grounded. The output of the digital-to-analog converter 34 goes over lead 41 to one input of an amplifier 36, which has a parallel connected variable impedance 37 for adjusting its gain and the slope of the resulting correction curve, and provides a variable gain device.

The tap on the master gain control potentiometer 26 is connected through impedance 38 to one input of a summing device 39, which has its other input connected through an impedance 40 from the output of amplifier 36, which other input is also connected to the point between the capacitor 30 and the variable impedance element 31. The output of summing device 39 is connected to the other side of variable impedance element 31 in order to vary its impedance in accordance with the output of the summing device.

One implementation of automatic quench compensation takes place as follows, referring to the diagram of FIG. 14. The base gain of the system is first set on an argon-flushed least possible quenched test sample by adjusting potentiometer 26. The discriminator windows of the various counting channels in the discriminator network 27 are also set in cooperation with the base gain. A least quenched sample of the type to be counted is positioned in a vial 21 between the photomultiplier tubes 20 and an external-standard channels-ratio is taken on the sample, in accordance with the steps outlined in the above referenced copending application of R. E. Nather. This external-standard channels-ratio appears as an output from the computer 29 and is stored in the external-standard memory 33. Next, this number is set into the reference side of the digital-to-analog converter 34 by dialing it into the thumbwheel switches 35 in order to establish a reference measure of quench.

Next, a highly quenched known sample of the material to be counted is positioned in a vial 21 in front of photomultiplier tubes 20 and again the external-standard channels-ratio is taken and appears as an output of the computer 29 and is stored in the external-standard memory 33. When the reference measure of quench has been taken on the highly quenched known sample of the material to be counted and applied to the input side of the digital-to-analog converter 34, the automatic quench compensation control, impedance 37, is adjusted until the endpoint of the spectrum of the sample is restored to the desired point. This may be done by adjusting the variable impedance 37 until a given small percentage of spill-over occurs into the next higher channel. The digital-to-analog converter 34 then provides at its output 41 a voltage proportional to the measure of quench. This voltage is fed through the amplifier 36, which together with impedance 37 provides a variable gain device, into the input of the summing device 39. Since the other input to summing device 39 represents the base gain, the output of the summing device represents the total gain required for automatic quench correction.

Figure 15:
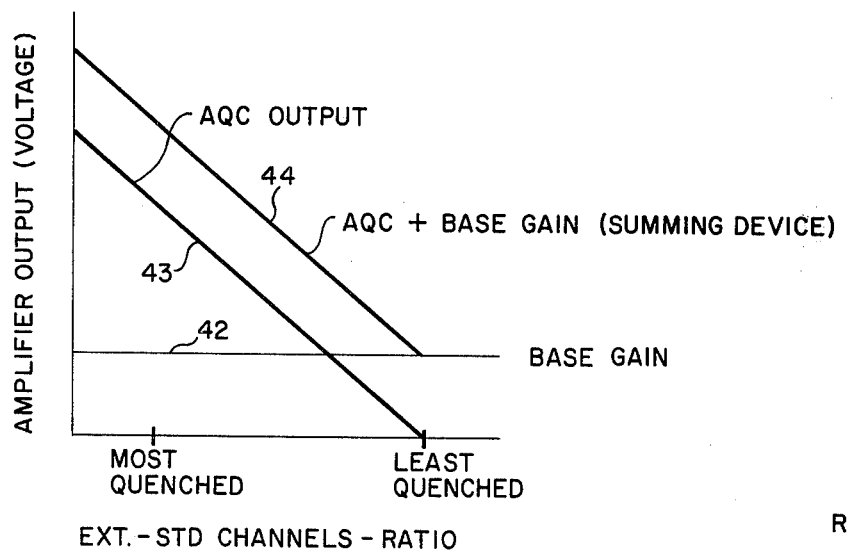
FIG. 15 is a graph illustrating the amplitude of the output voltage vs. external-standard channels-ratio for the summing device 39 of FIG. 14.

Referring to FIG. 15, drawn as linear for purposes of simplified illustration, the output of the summing device 39 is then the sum of the base gain 42 and the AQC output 43 which comes from amplifier 36. This results in the plot 44 at the output of the summing device 39. FIG. 15 is a plot of the amplitude of the output voltage vs. external-standard channels-ratio.

The output of the summing device 39 will then adjust the variable impedance device 31, which is the system parameter illustrated here to be varied by an amount required to restore the isotope spectral endpoint to its desired position. The magnitude of the device 31 will correspondingly affect the amplitude of the pulses coming from the pulse summation network 24 to the discriminators 27 and will provide the desired automatic quench compensation. The circuitry as thus set up will provide a reference voltage source such that when an external-standard channels-ratio is taken on subsequent samples, the output of the device 39 will adjust element 31 to provide the required quench compensation prior to taking a sample count.

Figure 16:
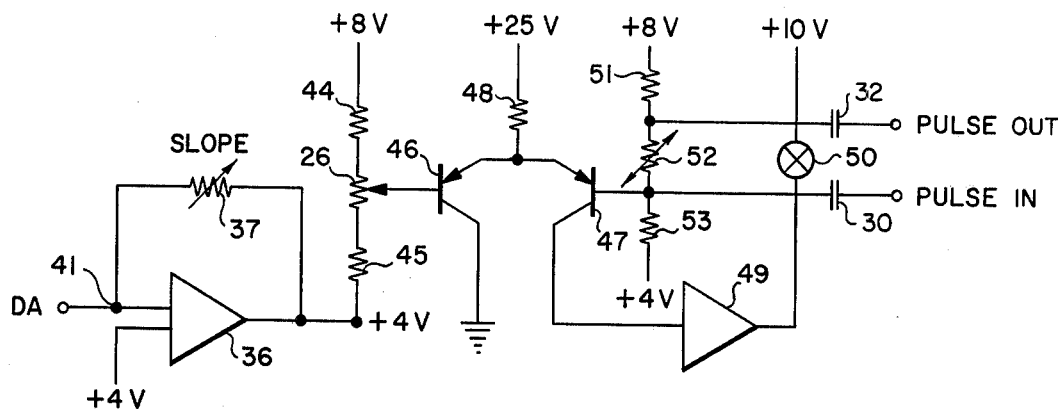
FIG. 16 is a schematic of the non-linear amplification portion of the block diagram of FIG. 14; and, FIG. 17 is a graph of gain vs. external-standard channels-ratio illustrating the curve fitting of a measured quench curve to the automatic compensation curve provided by the component values as specified in connection with the discussion of FIG. 16.

Suggested circuitry for implementing a portion of the block diagram of FIG. 14 can be seen in FIG. 16. Where the components are the same, the same numerals have been employed. Referring to FIG. 16, the output of the digital-to-analog converter 34 of FIG. 14 is fed to one input lead 41 of amplifier 36, having +4 volts, in the exemplary embodiment, applied to its other input terminal and the variable slope impedance 37 connected from its input to its output. The summing device 39 of FIG. 14 is provided in the circuit of FIG. 16 by connecting the master gain control potentiometer 26, which may be a 2000 ohm potentiometer, in a series circuit as follows: +8 volts is connected through an impedance 44, which may be 316 ohms, to one terminal of potentiometer 26, the other terminal of which is connected through an impedance 45, which may be 147 ohms, to a +4 volt source which is also connected to the output of the amplifier 36. The output of the summing network is taken at the tap of potentiometer 26, which is connected to the base of a transistor 46, providing one side of a differential amplifier, having as its other side the transistor 47. The emitters of transistors 46 and 47 are connected together and through an impedance 48 (43000 ohms) to +25 volts.

The collector of transistor 46 may be connected to ground and the collector of transistor 47, through an amplifier 49 in series with a variable light source 50 to +10 volts. A second series network connects +8 volts through an impedance 51 (100 ohms), a photoresistor 52 (together with light source 50 a Clairex CLM3012), and a second impedance 53 (511 ohms) to +4 volts. The point between impedances 52 and 53 is connected to the base of transistor 47 and also through the capacitor 30 to the pulse input, which goes in turn to the pulse summation network 24 of FIG. 14. The point between impedances 51 and 52 is connected through the capacitor 32, the other side of which is connected to the discriminator 27 of FIG. 14. The circuitry of FIG. 16 is provided in order to obtain the desired non-linear characteristic required to provide automatic quench compensation in a particular liquid scintillation machine and is only given by way of example. The shape of the characteristic may be modified by the proper selection of the impedances 44, 45, 51 and 53.

Figure 17:
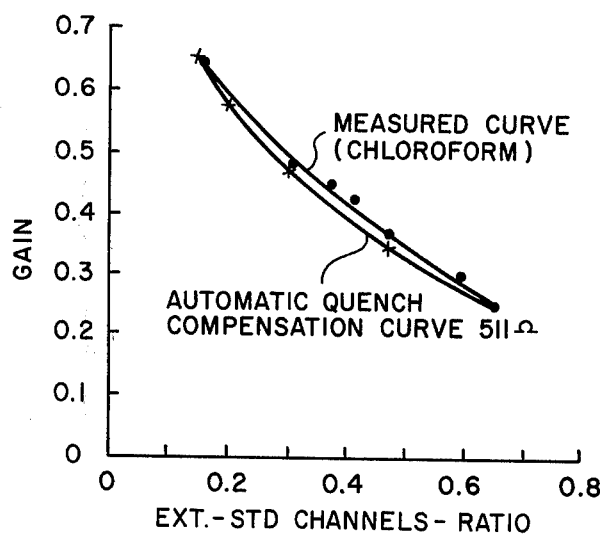

Referring to FIG. 17, the upper curve is a measured curve for CHCl₃ and the lower curve shows the autocompensation curve resulting from the component values of the above example. FIG. 17 plots the external-standard channels-ratio vs. gain and it can be seen that the autocompensation curve very closely follows the measured curve, closely matching the disired non-linear characteristics.

Returning now to FIG. 14, the dashed line 54 is shown as leading from the output of the summing device 39 to the discriminator network 27, and to the high voltage 22 for the photomultiplier tubes. These are indicated as alternative possible connections for modifying other system parameters in accordance with a desired change in them required to restore the endpoints of the spectrum. It is obvious that a modification of the high voltage source 22 would adjust the energy of the output pulses from the photomultiplier tubes and, accordingly, would adjust the endpoints of the spectrum with regard to the discriminator window positions should they be fixed. On the other hand, the compensation voltages, if applied to the discriminator levels defining the windows of the various channels themselves, may modify them to adjust the windows downward when quenching occurs to line them up with the spectrum endpoints, which have been modified due to quenching.

Since the principles of the invention have now been made clear, modifications which are particularly adapted for specific situations without departing from those principles, will be apparent to those skilled in the art. The appended claims are intended to cover such modifications as well as the subject matter described and to only be limited by the true spirit of the invention.

What is claimed is:

1. A method of automatically compensating for spectral shift due to quench in a liquid scintillation nuclear counter having an adjustable and voltage-controllable parameter to which the alignment of the spectral energy end-point of an isotope with a selected discriminator level is responsive, wherein the counter has at least one energy level counting window, a computer, and a digital-to-analog converter for producing an output voltage proportional to the difference between a reference input and a sample input thereto, said method comprising the steps of:
   establishing a first reference measure of quench as reference input of the digital-to-analog converter,
   taking a count on a reference sample of the isotope with an external standard source,
   calculating in the computer a measure of quench of the reference sample and applying said measure of quench as the sample input of the digital-to-analog converter,
   adjusting the level of said parameter of the liquid scintillation counter so that the spectral energy end-point of the reference sample is substantially aligned with a selected counting window discriminator level,
   taking a count on a test sample of the isotope with the external standard source,
   calculating in the computer a measure of quench of the test sample,
   establishing the sample measure of quench as the sample input of the digital-to-analog converter thereby permitting automatic adjustment of the level of the voltage-controlled parameter in response to the output voltage of the digital-to-analog converter so that the spectral energy end point of the test sample is substantially restroed to the selected discriminator level, and thereafter noting the count on the sample while maintaining the voltage-controlled parameter at the adjusted level.

2. The method according to claim 1, wherein said first reference measure of quench is taken from a least-quenched sample of the type to be counted in said window, said reference sample is highly quenched, and the output of the converter is applied through a variable impedance device to the input of a summing device having a preset base gain and whose output represents the desired level of said voltage-controllable parameter.

3. Apparatus for optimizing counting conditions in test samples containing n radioactive isotopes disposed in a liquid scintillator with each isotope being of the type that produces an observable energy spectrum, said apparatus comprising a light transducer, means for positioning a sample adjacent said transducer in light transmissive relationship therewith, means for measuring a selected quench indicating parameter indicative of the quench level of the sample, $n$ pulse height analyzers for analyzing pulses emanating from said transducer, said $n$ pulse height analyzers each including means for discriminating pulses on the basis of pulse heights, and means responsive to said measured quench indicating parameter for automatically adjusting the operating level of said discriminating means according to the value of said measured parameter.

4. A method of optimizing counting conditions in test samples containing $n$ radioactive isotopes disposed in a liquid scintillator with each isotope being of the type that produces an observable energy spectrum, said method comprising the steps of positioning a sample adjacent a light transducer in light transmissive relationship therewith, measuring a selected quench indicating parameter indicative of the quench level of the sample, analyzing pulses emanating from said transducer by $n$ pulse height analyzers each including means for discriminating pulses on the basis of pulse heights, and automatically adjusting the operating level of said discriminating means in response to said measured quench indicating parameter and according to the value of said measured parameter.

5. Apparatus for optimizing counting conditions in test samples containing $n$ radioactive isotopes disposed in a liquid scintillator with each isotope being of the type that produces an observable energy spectrum, said apparatus comprising a light transducer, means for positioning a sample adjacent said transducer in light transmissive relationship therewith, means for measuring a selected quench indicating parameter indicative of the quench level of the sample, $n$ pulse height analyzers for analyzing pulses emanating from said transducer, said $n$ pulse height analyzers each including means for discriminating pulses on the basis of pulse heights, and means for compensating for quench induced shifts in the energy spectrums of the isotopes relative to operating levels of said discriminating means including voltage controllable means for controlling the relationship between an endpoint of the energy spectrum of one or more of the isotopes and the operating level of one or more of the discriminating means and precalibrated means responsive to said measured quench indicating parameter of applying a voltage to said voltage controllable means to automatically restore the relationship of the endpoints of the shifted energy spectrums to the operating levels of the discriminating means.

6. The apparatus of claim 5, wherein said voltage controllable means includes means for adjusting operating levels of said discriminating means.

7. A method of optimizing counting conditions in test samples containing $n$ radioactive isotopes disposed in a liquid scintillator with each isotope being of the type that produces an observable energy spectrum, said method comprising the steps of positioning a sample adjacent a light transducer in light transmissive relationship therewith, measuring a selected quench indicating parameter indicative of the quench level of the sample, analyzing pulses emanating from said transducer by $n$ pulse height analyzers each including means for discriminating pulses on the basis of pulse heights, and automatically adjusting an endpoint of the energy spectrum of one or more of the isotopes relative to an operating level of one or more of the discriminating means in response to said measured quench indicating parameter and according to the value of said measured parameter.

8. A method of automatically compensating for spectral shift due to quench in a liquid scintillation nuclear counter having an adjustable and voltage controllable parameter for controlling the relationship between an endpoint of an energy spectrum of an isotope and an operating level of a discriminator defining a counting window for the counter, a comparator for producing an output voltage proportional to a difference between a reference input and a sample input thereto, and a variable gain device coupling the output of said comparator to said voltage controllable parameter, said method comprising:

measuring the degree of quench in a relatively low quenched first reference sample of the type to be counted and establishing a signal indicative of said measured low degree of quench as a reference input to the comparator;

measuring the degree of quench in a highly quenched second reference sample of the type to be counted and establishing a signal indicative of said measured high degree of quench as a sample input to the comparator;

adjusting the gain of the variable gain device to establish a predetermined relationship between the endpoint of the energy spectrum for the second reference sample and an operating level of the discriminator;

measuring the degree of quench in the sample to be counted, establishing a signal indicative of said measured quench as the sample input to the comparator and applying the voltage output of the comparator to the voltage controllable parameter to automatically restore the predetermined relationship between the endpoint of the energy spectrum for the sample to be counted and an operating level of the discriminator; and counting the sample to be counted.

* * * * *